Oct. 23, 1956     A. E. WHITECAR     2,767,873
LABELING MACHINE

Original Filed May 15, 1953     3 Sheets-Sheet 1

INVENTOR.
ALTEN E. WHITECAR

BY

ATTORNEYS

Oct. 23, 1956  A. E. WHITECAR  2,767,873
LABELING MACHINE
Original Filed May 15, 1953                                 3 Sheets-Sheet 2

INVENTOR.
ALTEN E. WHITECAR
BY
ATTORNEYS

Oct. 23, 1956     A. E. WHITECAR     2,767,873
LABELING MACHINE

Original Filed May 15, 1953     3 Sheets-Sheet 3

INVENTOR.
ALTEN E. WHITECAR
BY
ATTORNEYS

United States Patent Office 2,767,873
Patented Oct. 23, 1956

2,767,873

LABELING MACHINE

Alten E. Whitecar, Westville, N. J., assignor to Smith, Kline & French Laboratories, Philadelphia, Pa., a corporation of Pennsylvania Original application May 15, 1953, Serial No. 355,214, now abandoned. Divided and this application September 13, 1955, Serial No. 534,068

2 Claims. (Cl. 216—56)

This invention relates to a labeling machine, and more particularly relates to such a machine which is especially useful for applying large labels which extend to the underside of the container when it is in position for labeling.

It is an object of this invention to provide a labeling machine which will support, for example, a tube or a bottle in a manner permitting ready placement of the tube or bottle on the support and yet which will permit the application of a large label about the periphery of the tube or bottle.

This and other objects of this invention will be apparent from a reading of the following description in conjunction with the drawings, in which.

The improvement of this invention can be most simply described with reference to an exemplary prior art labeling machine. The labeling machine of Patent No. 2,227,816, issued January 7, 1941, to G. W. von Hofe, discloses such an exemplary machine and the disclosure of this patent, hereinafter referred to as the "reference patent," is made a part of this specification except where modified as noted in the description which follows.

In order to facilitate the description of the parts of the machine to be described which are old in the art as shown in the reference patent, the parts which are disclosed in the reference patent carry the same numerals found in the reference patent, while the new parts in accordance with the invention are numbered starting with the numeral 200.

Figure 1:
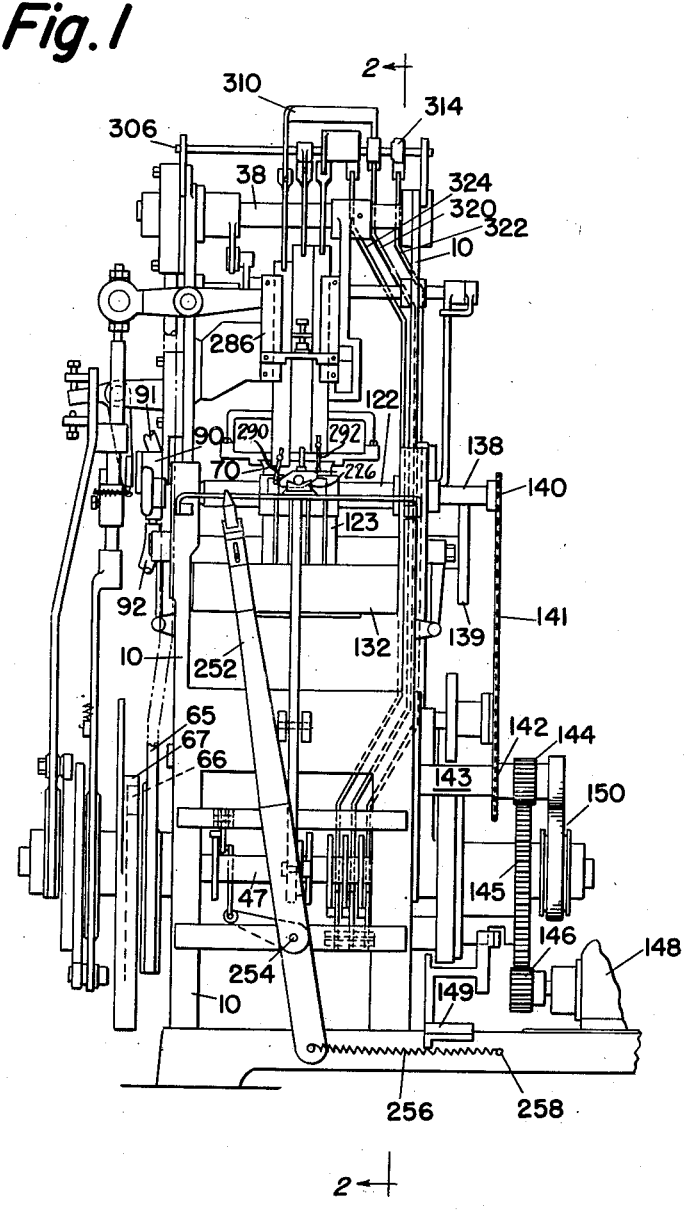
Figure 1 is a front elevation of the improved labeling machine.
Figure 2:
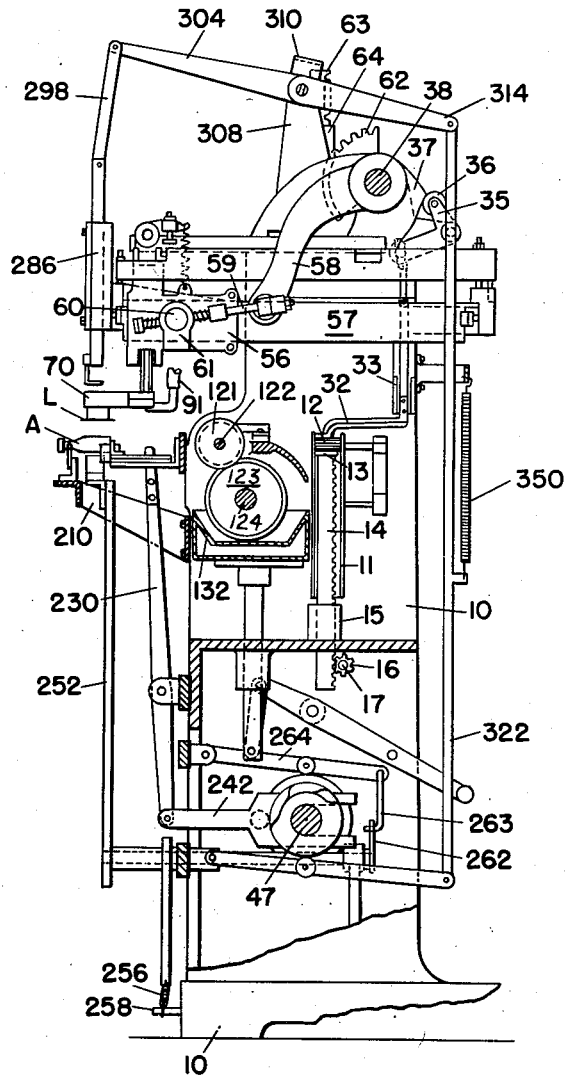
Figure 2 is a cross-section, taken on the plane indicated by the line 2—2 of Figure 1.

As shown in Figures 1 and 2, the machine includes a supporting frame 10 on which the mechanism is mounted. The machine will accommodate a supply of labels in a hopper 11 in the form of an upright stack 12. To maintain an operative upper level of stack 12, the bottom 13 of hopper 11 is vertically adjustable by means of a rack 14 in a guide 15 on frame 10. Rack 14 meshes with pinion 16 fixed to shaft 17 journaled on frame 10. The elevating rack 14 and pinion 16 are actuated by a conventional ratchet and pawl mechanism (not shown) and controlled by means of a feeler 32 in a vertical guide 33 on frame 10. The feeler 32 is operated by means of a cam 37 on rock shaft 38 through bell crank 35 and cam follower 36. This mechanism is fully disclosed and explained in Patent No. 2,227,816.

The label transferring means has a carriage 56 slidably mounted on guide rail 57, supported on frame 10. The carriage 56 is reciprocated on rail 57 by means of arm 58 fixed on rock shaft 38, having its free end pivotally connected with a coupling rod 59, which in turn is connected at 60 with a lug 61 fixed on carriage 56, as shown in Figure 2.

Said shaft 38 is rocked by means of a segment 62 fixed upon said shaft and meshing with a rack 63 vertically movable in a guideway 64 located on the frame 10 as shown in Figures 1 and 2. The rack 63 is located at the upper end of a member 65 which has at its lower end a cam follower 66 in operative engagement with a cam 67 fixed upon the shaft 47. The cam 67 is of such form as to vertically reciprocate the rack 63, segment 62, and shaft 38 in timed relationship with the other elements of the machine.

The carriage 56 serves as a support for a vertically slidable suction head 70, the specific construction of which may be of any conventional type. The operation of said carriage 56 and suction head 70 may be operated exactly as described in the reference patent and need not be repeated here.

Automatic control of the suction head is provided by means of a suitable valve 90 supported on frame 10 and connected by means of a flexible tube 91 with the suction head 70. A flexible tube 92 leads from the valve 90 to a source of suction, such as a vacuum pump (not shown). In the instant machine, the labels picked successively by the suction head 70 from the stack 12 are provided with a coating of adhesive on one surface during the transfer of said labels from said stack 12 to the point of application to the articles A. For this purpose the machine includes adhesive applying means comprising a roller 121 carried by a shaft 122 suitably journaled in the frame 10 and an adhesive distributing roll 123 located on shaft 124. These rolls are relatively adjustable and operate in the manner described in the reference patent. The distributing roll 123 dips into a supply of adhesive in a container 132 of suitable construction and dimensions, mounted in the machine in any convenient manner.

The rolls 121 and 123 are geared together by means of a pinion 138 on the shaft 122 and a gear 139 on the shaft 124. Roll 121 is driven by means of a sprocket wheel 140 on the shaft 122, a chain 141 and a sprocket wheel 142 on a stub shaft 143 suitably journaled on frame 10. The shaft 143 carries a pinion 144 which meshes with a gear 145 on the shaft 47. Said gear 145 in turn meshes with a pinion 146 on the electric motor 148, which drives the entire machine. A suitable clutch actuated by treadle 149 may be provided and conventional overrunning or drag brake 150 to prevent over-run and other unintentional operation of the mechanism.

All of the mechanism described thus far is disclosed in the reference patent in great detail.

Figure 3:
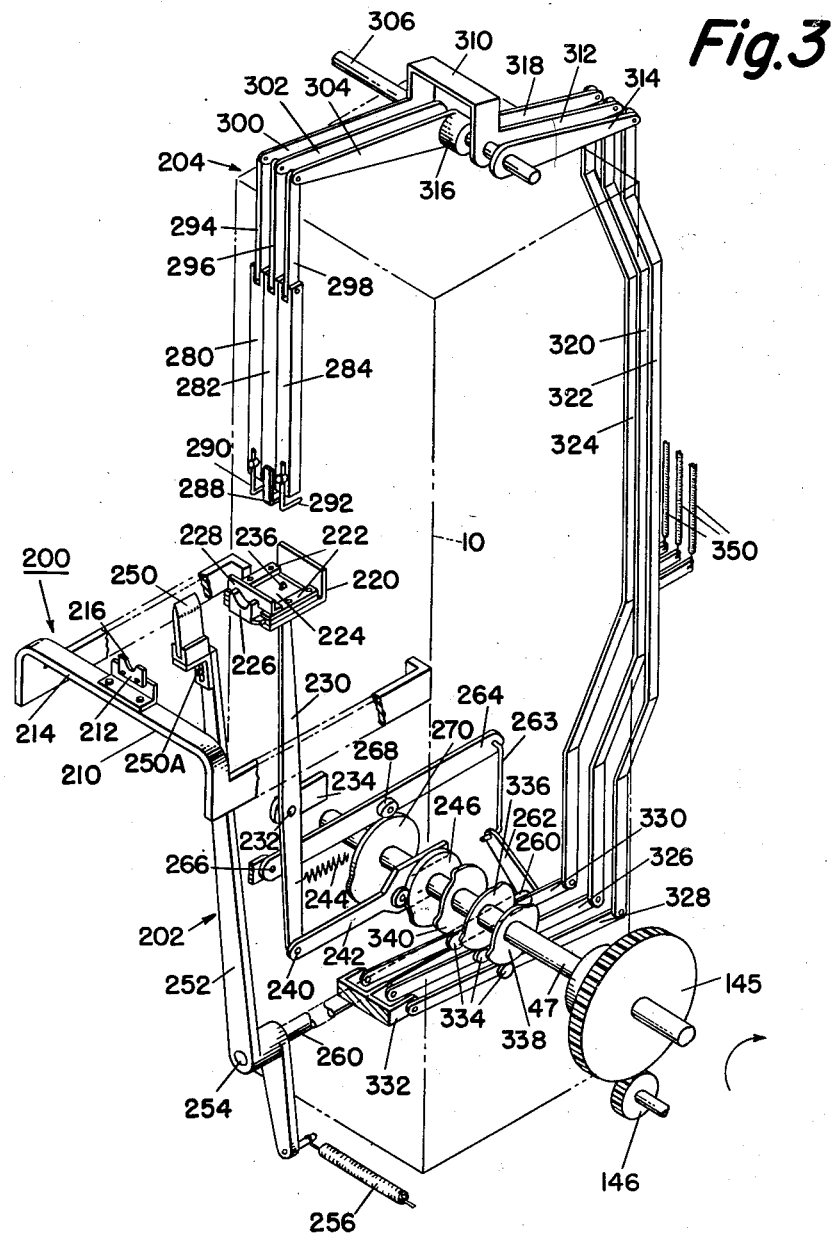
Figure 3 is a perspective view of the novel elements of the machine assembled in their operating positions and is partially exploded to more clearly show the wiping mechanism and the object supporting means.

While the novel object supporting means of the machine is shown in Figures 1 and 2, it can best be seen in Figure 3, where essentially all but the main operating shaft 47 of the original machine has been omitted. The novel object supporting means is indicated generally at 200 and is shown with label wiping mechanism 202 and label holding and depressing means 204. The object supporting means 200 comprises a yoke member 210 secured by suitable means to the front of the frame 10. A thin bladelike supporting member 212 is mounted on the outer cross member 214 of said yoke 210. The support 212 is suitably notched at 216 to receive the neck of a bottle, tube cap, or the like. A second part 220 of the object supporting means 200 is secured to the front of frame 10 intermediate the arms of yoke 210. It has a pair of guideways 222 in which is slidably mounted a plate 224. A saddle member 226 is located on the front of said plate 224. A fence member 228 straddles the guideways 222 at their outer extremes and is suitably cut to permit the saddle member 226 to be reciprocated through it. Together the support member 212 and the saddle member 226 hold the object to be labeled at its extremes.

Lever arm 230 is pivoted at 232 to a bracket 234 suitably secured to the front of frame 10. Its upper end projects through an opening in the slidable plate 224 at 236. The lower end of lever arm 230 is pivotally secured at 240 to a cam follower 242 which is biased by a spring 244 against a cam 246 secured to the drive shaft 47. The cam 246 is so formed as to permit a large area of the saddle 226 to project in front of the fence 223 at the time the operator places a bottle or other object in place to be labeled. However, during operation of the label applying mechanism, the cam 246 and lever arm 230 retract the saddle 226 against the action of spring 244, leaving a minimum of necessary supporting area for the object to be labeled, thus providing space to apply a maximum size label. Since the cam 246 is secured to the main drive shaft 47, it can be readily timed to operate the object supporting mechanism in timed relationship with the other parts of the machine.

The label wiping mechanism 202 has a wiper blade 250 of rubber or other resilient material at the top of a lever arm 252, pivoted at 254 and biased in a counterclockwise direction by means of a spring 256. Said spring 256 is fastened to the bottom of lever arm 252 and to the base frame 10 by pin 258, shown in Figures 1 and 2. The pivot 254 is on a shaft 260 suitably journaled to the frame 10, to which the lever arm 252 is rigidly secured. A crank 262 is secured to the opposite end of shaft 260 at the rear of the machine. A connecting rod 263 links crank 262 to a cam follower arm 264. Cam follower arm 264 is pivoted to the front of the frame 10 at 266. A roller 268 on cam follower arm 264 bears on the cam 270 secured to the main drive shaft 47. A study of the figure will reveal that the counterclockwise bias of the lever arm 252 also causes the cam follower roller 268 to be biased against the operating cam 270. The profile of said cam is such as to produce a periodic swing of the lever arm 252 in a clockwise direction, through a short arc, then pause, and finally swing back to the original position at rest as shown in the figures.

This motion sweeps the wiper blade 250 from side to side within the confines of the object supporting yoke 210. Wiper blade 250 is adjustable on arm 252 at 250A, so that its tip will wipe a suitably depressed label around the object on the support 200.

Means for suitably depressing said labels is provided in the mechanism generally designated as 294. Three piston-like members 280, 282 and 284 are retained for vertically slidable operation in a guideway 286 shown in Figures 1 and 2.

At the bottom of member 282 an adjustable pressure foot 288 is secured. Depresser fingers 290 and 292 are adjustably secured to the lower ends of members 280 and 284, respectively. These may be, for example, two pieces of heavy wire bent to suit the particular label being applied.

Connecting rods 294, 296 and 298 are pivotally secured to the upper ends of piston members 280, 282 and 284, respectively, and in the order given are pivotally secured at their upper ends to lever arms 300, 302 and 304. Said lever arms are supported on a shaft 306 suitably journalled in bearing brackets 308 (see Figure 2), secured to the top of the frame 10.

Lever 300 pivots freely on shaft 306 and is connected by means of a bridging member 310 to a lever 312 projecting toward the rear of the machine.

Lever 302 is secured fast on the shaft 306 and is operated in a manner to be described, by means of a lever 314, which is also secured fast to shaft 306.

Lever 304 is secured to a hub 316, pivotally mounted on shaft 306 and secured to the opposite end of this hub is an operating lever 318. Pivotally secured to the outer rearward extremities of the operating levers 312, 314 and 318 are three irregularly shaped connecting rods 320, 322 and 324, respectively, which in turn are connected pivotally to three cam follower arms 326, 328 and 330, respectively, pivoted in a suitable bracket 332 secured to the frame 10.

Each follower arm is provided with a roller 334, which is biased against its respective cam 336, 338 and 340. Cams 336, 338 and 340 are secured to the main operating shaft 47 and are profiled to actuate their respective levers in a timed orderly sequence to be hereinafter described. The biasing of the follower arm rollers against these cams is accomplished by individual tension springs 350 secured to the connecting rods 320, 322 and 324 and to frame 10.

*Operation*

With the motor 148 running and clutch 149 engaged, an object, such as bottle A, is placed on the support 200. This is facilitated due to the large supporting area presented by the saddle member 226, which is extended forwardly when the clutch 149 is engaged.

A label L is transferred from the hopper 11 by means of the suction head 70 and its attendant mechanism, already described in the reference patent, to the bottle A. Just before the suction head 70 places a label on bottle A, the cam 246 on shaft 47 pushes follower arm 242 forward, swinging lever arm 230 in a clockwise direction about its pivot 232, as viewed in Figures 2 and 3. This retracts saddle support 226 to a practical minimum without disturbing the bottle A, which is restrained from following the saddle 226 by the fence member 228. The suction head 70 deposits the gummed label L on the bottle A and then withdraws from position, as fully described in the reference patent.

Through the action of lever 302, lever 314, connecting rod 322 and its associated spring, pressure foot 288 is lowered in position to hold label L on bottle A, cam 338 permitting this action by allowing cam follower 328 to rise. At the same time, cams 336 and 340 permit fingers 290 and 292 to be lowered to the level of pressure foot 288 through the operation of their attendant linkages and spring 350. Cam 336 then permits its attendant linkage to actuate depresser finger 290 through the action of its associated spring 350. Finger 290 is depressed downwardly opposite bottle A and thus extends the one end of label L into the path of wiper blade 250 which is next actuated by cam 270 on shaft 47 and its attendant linkages. This wipes one end of the label around and under bottle A.

Depresser finger 292, through the action of its associated spring 350, as permitted by cam 340, descends and thus depresses the other end of the label into the path of wiper blade 250. Cam 270 and spring 256 act to reverse the direction of wiper blade 250, which forces the thus depressed end of label L under bottle A and in close contact therewith. Fingers 290 and 292 and pressure foot 288 are now returned to their maximum elevated positions by the action of cams 336, 340 and 338 and their attendant cam followers and linkages, respectively.

The saddle support 226 is returned to its original position by spring 244, bottle A is replaced with another bottle and the cycle repeated.

It is not desired to be limited except as set forth in the following claims.

This application is a division of my application Serial No. 355,214 filed May 15, 1953, now abandoned.

What is claimed is:

1. In a labeling machine adapted to apply a label to a container surface; supports for opposite ends of a container, one of said supports being retractable in order to provide a large area for labeling, means to retract said retractable support after placement of the container therein and means to apply a label to the surface of the container so that a portion of said label is overlying a portion of the area occupied by said retractable support means before it was retracted.

2. In a labeling machine adapted to apply a label to a container surface; supports for opposite ends of a container, one of said supports being retractable in order to provide a large area for labeling, means to retract said retractable support after placement of the container therein, stop means adapted to engage the end of the container resting on the retractable support to prevent the container from being moved when said retractable support is retracted and means to apply a label to the surface of the container so that a portion of said label is overlying a portion of the area occupied by said retractable support means before it was retracted.

References Cited in the file of this patent

UNITED STATES PATENTS

| 1,587,325 | Johnson et al. | June 1, 1926 |
| 2,268,760 | McConnell et al. | Jan. 6, 1942 |
| 2,319,969 | Bessemer | May 25, 1943 |

FOREIGN PATENTS

| 513,017 | Great Britain | Oct. 2, 1939 |